United States Patent [19]
Michaud et al.

[11] 3,804,270
[45] Apr. 16, 1974

[54] BULK STORAGE AND AUTOMATIC PRESENTER SYSTEM WITH IMAGE PRODUCING MEANS

[75] Inventors: Jimmie A. Michaud, Bellbrook; Jack R. Stroman, Kettering, both of Ohio

[73] Assignee: The Bendix Company, Southfield, Mich.

[22] Filed: Jan. 12, 1973

[21] Appl. No.: 323,005

[52] U.S. Cl........... 214/16 B, 209/111.7, 214/1 BC, 214/1 CM
[51] Int. Cl............................ B25j 3/00, B65g 1/04
[58] Field of Search........ 214/16 B, 16.4 R, 16.4 A, 214/1 CM, 1 B, 1 BC, 1 BS, 1 BT, 1 BH, 1 BV; 294/64 R, 64 A–64 B; 209/111.7

[56] References Cited
UNITED STATES PATENTS

| | | | |
|---|---|---|---|
| 3,436,968 | 4/1969 | Unger et al...................... | 214/6 P X |
| 3,586,176 | 6/1971 | Rackman............................ | 214/6 P |

OTHER PUBLICATIONS

Stanford Artificial Intelligence Report; Memo No. A.1. 56 "Use of Optical Feedback in the Computer Control of an Arm" rec'd. in U.S. Patent Office on July 2, 1969.
"Computer Control of a Mechanical Arm through Visual Input" – K. K. Pingle et al.; Computer Science Dept. Stanford Univ. – Rec'd. in U.S. Patent Office on July 2, 1969.

Primary Examiner—Gerald M. Forlenza
Assistant Examiner—R. B. Johnson
Attorney, Agent, or Firm—John R. Benefiel

[57] ABSTRACT

A system is disclosed for presenting parts or workpieces from a bulk storage location to a presenter staging location singly and in a determined position, this system including a separator mechanism for removing workpieces singly from one or more bulk storage locations and transferring the same to be deposited at a presenter staging location, the separator transfer mechanism being combined with a video system which develops an image of the workpiece and staging location and generates corresponding video data which is processed to identify the workpiece and determine its position including its location and orientation with respect to the staging location. This information is used to generate a control signal which is transmitted to the control system of a utilization device, disclosed as a programmable assembly arm, so that the utilization device's mode of manipulating the workpiece corresponds to the position of the deposited workpiece as determined from the video data. This system thus provides a general purpose automatic presenter system suitable for automatic assembly operations.

5 Claims, 7 Drawing Figures

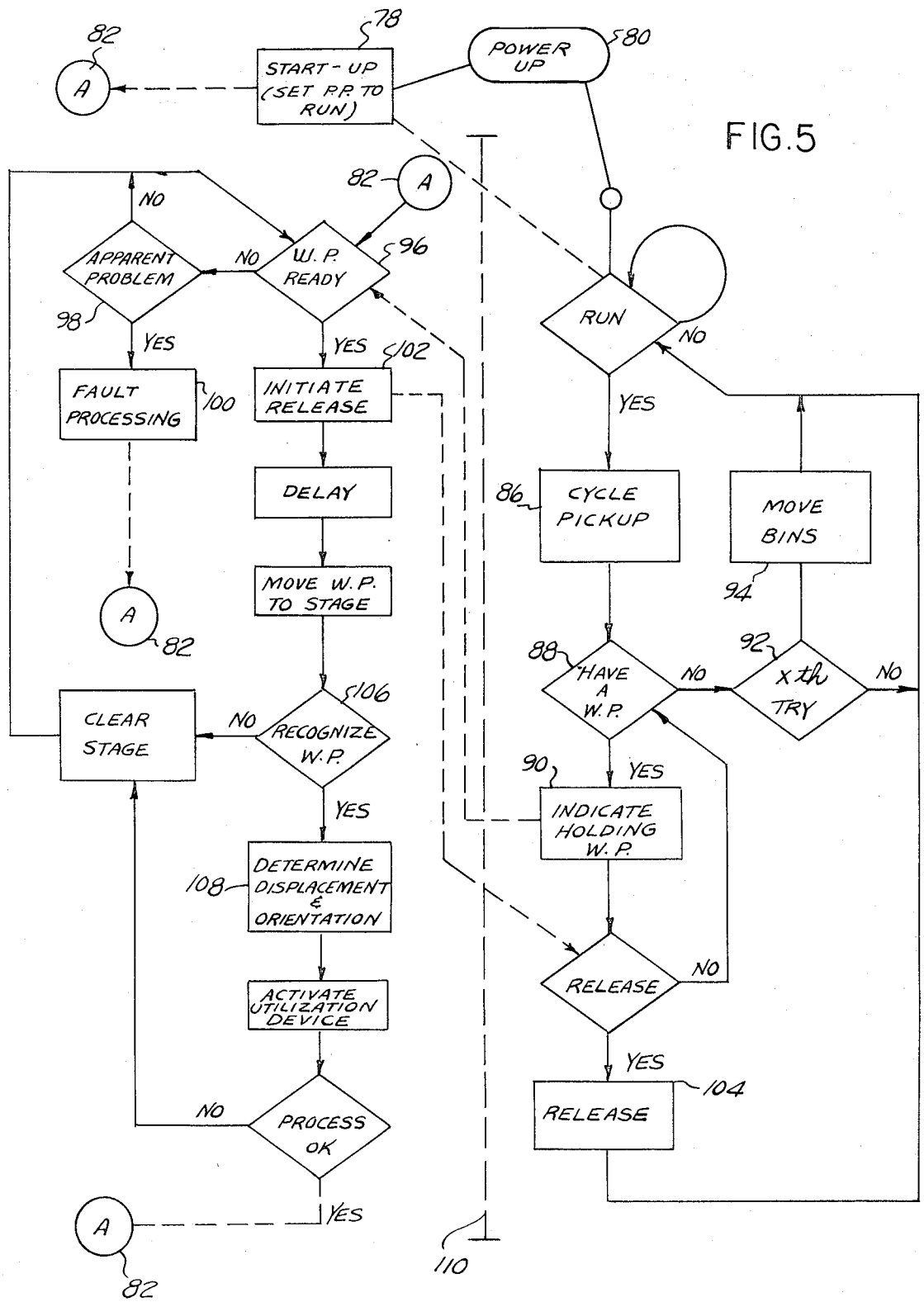

BULK STORAGE AND AUTOMATIC PRESENTER SYSTEM WITH IMAGE PRODUCING MEANS

BACKGROUND OF THE INVENTION

1. Field Of The Invention

This invention concerns arrangements for presenting parts, workpieces, or other objects and more particularly for removing such objects from bulk storage locations and transferring them singly to another location for further handling by another device such as an automatic assembly machine.

2. Description Of The Prior Art

For obvious reasons, efforts are continuously being exerted to automate nearly every physical process involved in the manufacture and handling of the myriad products and artifacts of modern civilization, as witness the constantly increasing array of modern automatic manufacturing machinery, automated material handling equipment such as mail sorters, automatic gaging and classifying equipment, etc.

This equipment is for the most part highly sophisticated and requires large capital investments, and accordingly rather large production runs or part volumes of items of nearly identical configuration such as are found in the automotive industry are required to justify this expense.

This is particularly true of automatic assembly machines, since these machines have been by necessity custom designed and built for the assembly of a particular item, such as an automotive differential unit, which item is of an identical or nearly identical configuration, and the cost of each machine runs into the hundreds of thousands or millions of dollars.

It has been heretofore recognized that if greater flexibility were built into automatic machinery, i.e., if a wider variety of parts could be accommodated by such machines, a much greater segment of the assembly industry could be automated. This is so because while a great proportion of these physical processes involve item volumes on a scale not justifying the investment of such sums, if such equipment were possessed of a general purpose capability the aggregate volume could justify a much larger investment than any given single item.

This recognition has led to various general purpose, programmable manipulative devices, such as the programmable industrial robots currently available which are capable of carrying out various programmable movements to perform such operations as workpiece transfer ("pick and place"), welding, paint spraying, simple assembly, etc., and these devices can be reprogrammed as necessary for varying workpiece configurations and/or procedures. Examples of these are described in U.S. Pat. Nos. 2,988,237; 3,007,097; 3,051,328; 3,212,649; and 3,241,483.

However, one requisite particularly needed in the field of automatic assembly for fully automating these processes has not heretofore been provided, i.e., a general purpose automatic workpiece feeder or presenter, which is capable of transferring randomly oriented workpieces stored in bulk, of widely varying configurations to a utilization device such as an assembly machine and which is capable of presenting the workpieces in position for further handling by the utilization device.

The usual prior art approach has involved either manual loading to thus partially defeat the aim of automating the process to the fullest extent possible or the use of special purpose part feeders each designed for a particular part to thus limit their applicability due to the high cost of such special designs.

More recent approaches have been directed at vision systems which attempt to locate and identify parts while still stored in bulk with other parts. This task however presents very great technical difficulties in carrying out such identifying and locating procedures against the background consisting of an array of variously oriented other workpieces. Furthermore, the possible orientations of individual parts which are stored in bulk are almost infinite in number, compounding the vision problem mentioned above.

It would also be particularly advantageous, in automatic assembly operations, if such a general purpose presenter could be provided which had the capability of so presenting objects from several bulk storage locations in a programmable order and number, in order to be able to feed the parts required in assembling a great variety of products.

Any such arrangement must, of course, be not unduly complex in order to keep the cost of such equipment with a range in which it is economically justified in terms of a reasonable return on investment, in keeping with the relatively low total production volumes of some operations which are sought to be automated by the present invention.

Accordingly, it is an object of the present invention to provide an automatic general purpose presenter which is capable of transferring randomly oriented objects stored in a bulk storage location singly to a presenter staging location at which location the orientation and precise position of the part is determined, so that further handling of the object is facilitated.

It is a further object of the present invention to provide such a presenter which is capable of so transferring objects from several such bulk storage locations in a programmable order, whereby a general purpose parts feeder for automatic assembly operations can be provided.

SUMMARY OF THE INVENTION

These and other objects of the present invention which will become apparent upon a reading of the following specification and claims are accomplished by means of a separator mechanism which removes objects singly from a bulk storage location, and transfers the same to be deposited at a presenter staging location whereat the position of the object as deposited is determined, this determination being accomplished by means of a video system which creates an electrical representation of the image of the part as deposited at the staging location, and generates video data therefrom from which the object identification, orientation, and precise location at the staging location is computed. A control signal or signals are generated therefrom and transmitted to the control system of a utilization device so that its mode of manipulating the part corresponds to the computed object orientation and location.

DESCRIPTION OF THE DRAWINGS

FIG. 5 is a flow sheet of the control sequence of a presenter according to the present invention.

DETAILED DESCRIPTION

In the following detailed description certain specific terminology will be utilized for the sake of clarity and specific embodiments will be described in order to provide a complete understanding of the invention, but it is to be understood that the invention is not so limited and may be practiced in a variety of forms and embodiments.

Figure 1:
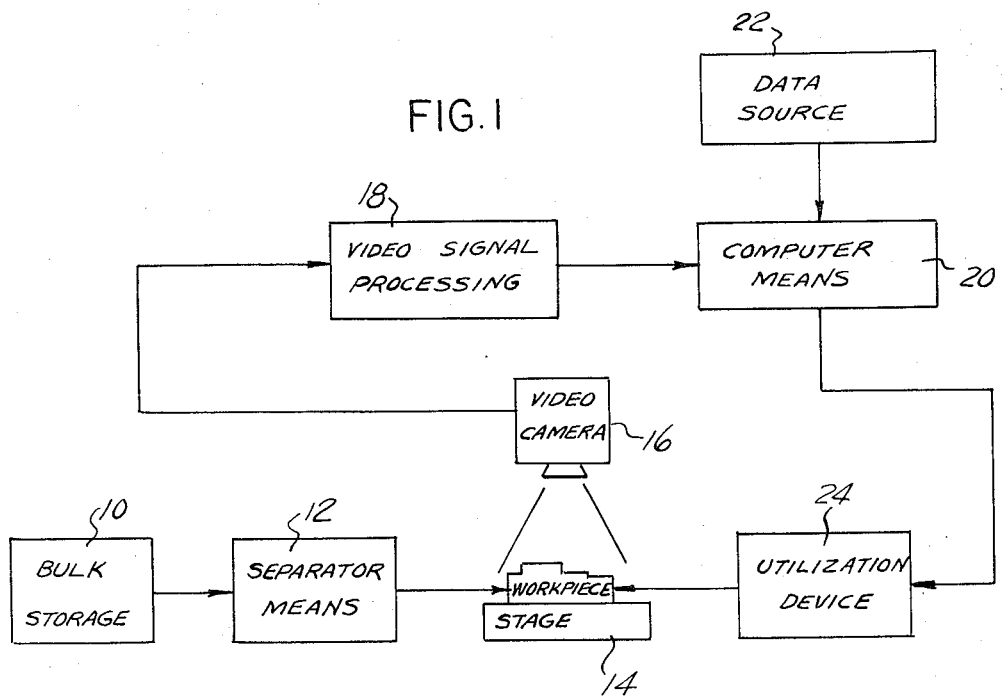
FIG. 1 is a representation of a presenter system according to the present invention.

Referring to FIG. 1, a block diagram representation of the system according to the present invention is depicted. This system includes a bulk storage location 10 which stores objects such as parts or workpieces in bulk and in a random orientation, and typically would take the form of a "tote" box commonly used to store and transport workpieces between stages in most manufacturing operations.

Workpieces are removed from such bulk storage locations singly and in random orientation, by means of a separator 12 which also transfers this workpiece to a staging location 14 and deposits the same at the staging location 14.

An electrical signal representation corresponding to the workpiece image as deposited at the staging location 14 is generated by means of a video camera 16 which produces a video signal corresponding to the image of the workpiece on the staging location 14. This camera would typically take the form of a vidicon camera tube, in which the workpiece image is focused on a photosensitive surface, where it is stored as a potential image in the form of a surface distribution of electrical charges. As is well known, this potential image is then discharged by a scanning electron beam that translates the charge distribution into a current proportional to the brightness of consecutive points on the surface, to thus produce a varying electrical signal corresponding to the image of the workpiece as deposited on the staging location.

The varying video signal is then converted into digital form and "cleaned up" by suitable processing circuitry 18 in order to be more readily handled by the computer means 20.

The computer means 20 receives the video data so generated, and first verifies that the image is a "correct" one; that is the image data is compared with a stored data "image" read in from a source of stored data 22 to verify that the workpiece image corresponds to the correct workpiece. In the event more than one image is possible for a given workpiece, that is, a workpiece of a particular configuration deposited at the staging location can assume more than one stable position each of which presents a different image to the video camera, a comparison of several such sets of stored data may be required. In the event the workpiece is not "correct," the workpiece would be removed by an ejection arrangement (not shown) or possibly a "fault" shutdown and indication generated.

The computer also computes from this video data the position of the workpiece on the staging location 14, the term "position" being understood to cover any or all of the various parameters describing the spatial condition of the deposited workpiece relative to the staging location. This would primarily cover the determination of the particular stable state which the workpiece has assumed, the locations of the workpiece on the staging location 14, that is, the location of the image centroid in the plane of the staging location 14, and also the particular rotative orientation of the workpiece at the staging location 14 and in the particular stable state assumed.

From these computations, an output signal is then generated by the computer means 20 which is used to control some utilization device 22 such as a manipulator arm for an automatic assembly apparatus, so that the mode of approaching and gripping the workpiece is modified correspondingly with the particular position of the workpiece on the staging location 14.

Thus, workpieces are presented from the bulk storage location 10 singly to the staging location 14 with their position on the staging location 14 thereafter determined.

It can be seen that in principle, this approach readily provides a general purpose capability, since only the stored data need be changed for various workpieces, and/or, in some cases, the computational steps, which of course may readily be done without any change in the hardware involved.

Furthermore, since each workpiece is video analyzed by itself at a location provided especially for this purpose, existing camera and signal processing technology can be utilized, at least for many workpiece configurations, since the very difficult technical problem of video analysis of images of workpieces located in bulk with other workpieces is avoided.

Figure 2:
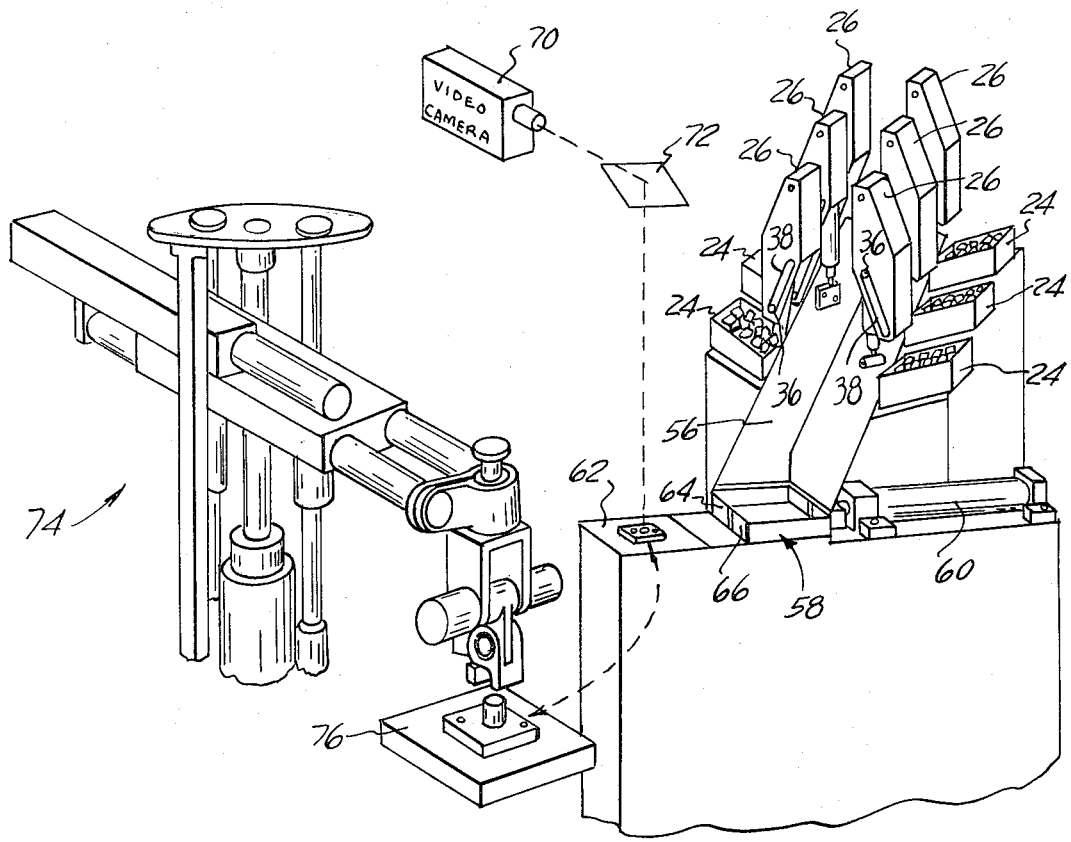
FIG. 2 is a perspective view of a presenter system according to the present invention together with a typical utilization device shown as an automatic assembly manipulator arm.

Referring to FIG. 2, a first embodiment of elements of a representative parts presenter system according to the present invention is depicted in a perspective view thereof.

Figure 3:
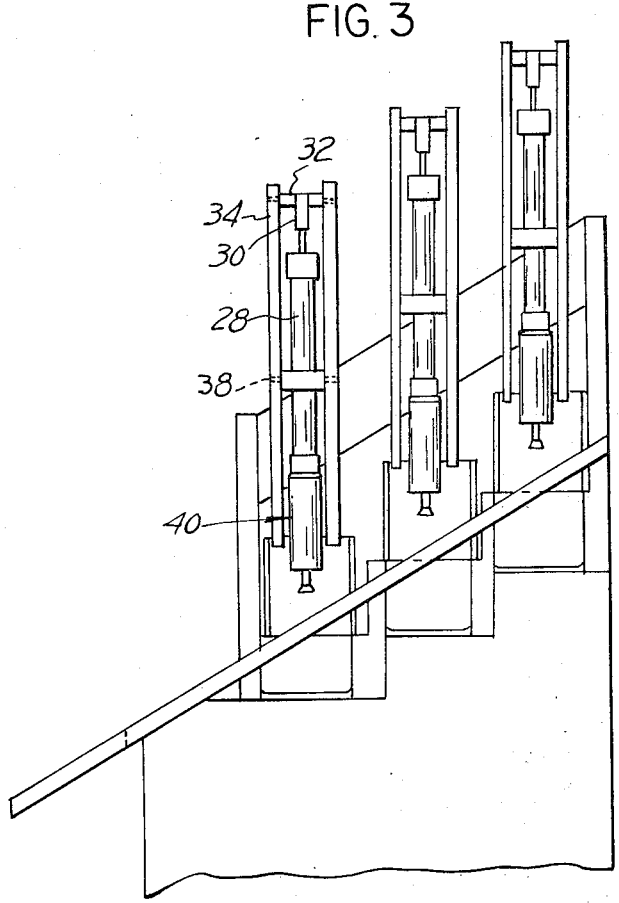
FIG. 3 is a detail view of a portion of the presenter system shown in FIG. 2.

This system includes a series of bulk storage locations 24 each containing randomly oriented objects such as workpieces. A separator mechanism is provided including a series of pick up mechanisms 26, one each disposed above a bulk storage location 24. Each pick up mechanism 26 includes a double acting power cylinder 28 (FIG. 3) having its operating rod 30 pivotally mounted at 32 to a housing 34. The cylinder itself is mounted by means of a pin 36 and slot 38 arrangement (FIG. 2) so that as the cylinder is stroked the cylinder housing pivots and moves upwardly and downwardly through a constrained path defined by the slot 38.

Affixed to each cylinder housing 34 are pick up implements 40 adapted to pick up a workpiece to which it is brought into contact by the power cylinder 28 and hold the same until a release control signal is received.

Figure 4:
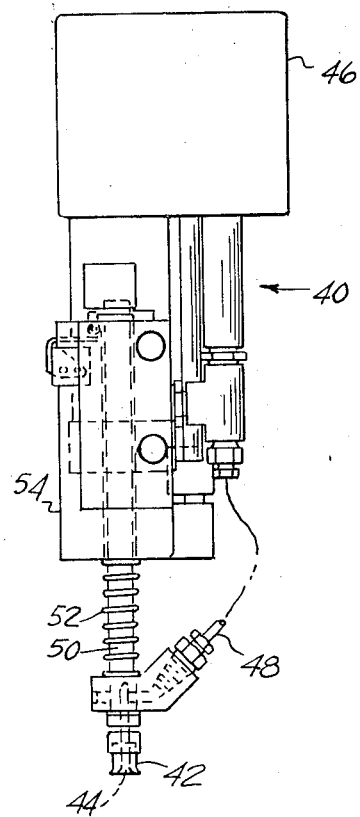
FIG. 4 is a detail view of pick-up tooling for the presenter system shown in FIG. 2.

Such an implement could be of greatly varying configurations and of a variety of operating principles such as electromagnetic, mechanical grapple, vacuum, etc., one such approach being shown in FIG. 4. In this approach, vacuum induced forces are utilized, and to this end a flexible tip 42 is provided, having a central passage 44 which connected to a vacuum source 46 via flexible hose 48 and intermediate connections.

The flexible tip 42 is mounted on a slide rod 50 resiliently biased downwardly by means of a spring 52, but capable of upward sliding motion against the bias by virtue of a sliding fit in a frame 54. Thus, the power cylinder may be stroked to bring the tip into contact with workpieces at any level in the bulk storage locations 24 within the degree of lost motion travel and the travel of the power cylinders.

Thus, upon descent of a pick-up implement 40 into a bulk storage location 24, the flexible tip 44 comes into contact with a workpiece to cause a workpiece to be held thereby and removed from the bulk storage location 24 upon upward motion of the pick up implement 40, which is produced by a reversal of motion of the power cylinder 28 in turn controlled by a microswitch (not shown).

Passing between the bulk storage locations 24 is an inclined "vee" chute 56 disposed to be beneath the pick-up implements 40 in their raised positions so that upon release of the workpieces they are guided downwardly into a transfer box 58 positioned at the lower end thereof.

The transfer box 58 is adapted to be reciprocated by a power cylinder 60 so as to move workpieces deposited therein to a staging location 62, with the transfer box 58 being bottomless and consisting of portions 64 and 66 adapted to be rotated apart from each other by a small power cylinder 68 so that workpieces deposited therein can be transferred to the staging location 62 but remain at this location upon rotation apart from each other and retraction of the transfer box 58. This arrangement reduces risk of injury by workpiece to the impact staging location 62, which may be of relatively fragile construction if certain video analysis background plates were used in the system, and also improves the reliability of the separation mechanism in depositing a single workpiece at the staging location 64.

Workpieces deposited at the staging location 62 are video analyzed by means of a video camera 70 combined with a mirror 72 so that an electrical representation of the image of the staging location 62 with the workpiece deposited thereon is produced, the output signals thereof processed as described above.

The particular utilization device pictured in FIG. 2 comprises a manipulator arm 74 which is adapted to grasp workpieces deposited at the staging location 62 and transfer the same to an assembly location 76 where the various assembly steps are carried out.

In such a device, the manipulator arm must of course be controlled so that it moves to a position corresponding to the particular location at which workpiece has been deposited at the staging location. In addition, the programmed mode of grasping the workpiece may vary with the particular "stable state" assumed by the workpiece, and additionally the rotative orientation of the arm may be required to correspond to the particular rotative orientation of the workpiece in order to carry out the grasping. Furthermore, even if the grasping step could successfully be carried out in a number of rotative orientations, it would be advantageous or necessary for the workpiece to arrive at the assembly location in a particular orientation.

Thus, the positional data generated by means of the video camera 70 and processing of the signal data produced thereby is used to control the manipulator arm 74 so that in picking up a workpiece it moves to a particular location over the staging location 62 and assumes a rotative orientation and selects a programmed pick-up mode all corresponding to the determined position of the workpiece on the staging location 62.

Referring to FIG. 5, a flow sheet for a typical control system for sequencing such an arrangement as shown in FIG. 2 for assembly operation is depicted.

After the system is started up the internal check is made to determine proper operational condition of the various subsystems, these checks represented by function blocks 78, 80, and the power cylinders 28 are then cycled by means of an enablement function 84 controlled by a signal from the program control 82 to pick up parts from each bulk storage location 24, this function represented by block 86.

After each such cycling, a determination is made at 88 (as by means of a load cell) as to whether a workpiece has in fact been picked up. If yes, an output indicator signal is generated at 90 indicating a workpiece is being held, while if no, and less than an xth try, the pick-up is recycled by a feedback signal to 84. If after some xth try, a workpiece has still not been picked up, some corrective measures may be taken, as moving or shaking the bins, indicated by function blocks 92 and 94.

A workpiece ready signal is then combined in a workpiece release control function 96 with the program control function 82. If the lack of a workpiece being ready indicates a malfunction or problem as deduced from other system inputs by function 98, a problem signal is produced which is processed in fault processing function 100 to initiate remedial steps which may involve interaction with the program control function 82.

If a workpiece is indicated as being ready and the program calls for release of the particular workpiece, the release is initiated at 102, with a subsequent fixed delay to allow for the workpiece to come to rest in the transfer box 58, after which the workpiece is moved to the stage 62 by movement of the transfer box 58.

After release of the workpiece at 104, the pickup cycle is repeated as indicated.

The image of the workpiece deposited at the staging location is then correlated with stored data at 106 to determine if the workpiece is the correct one, that is, is the workpiece at the staging location the particular one called for by the program control 2?. If it is not, the workpiece is removed from the staging location 62 (as by extension of the transfer box 58) and feeding of the proper workpiece is again attempted. If it is the correct workpiece, the image data is processed at 108 to determine the workpiece position on the staging location 62, to produce an output control signal corresponding to this position, which control signal is used to activate the utilization device (manipulator arm 74) to properly approach and pick up the workpiece. If a successful pick up is achieved, the program control 82 is provided with an indication so that the remainder of the program can be carried out.

If this system is used in conjunction with a small computer and automatic assembly operations, it can be appreciated that those control and computation functions represented to the left of line 110 could be advantageously performed by the computer while those to the right thereof can be advantageously carried out by means of hardware circuitry.

Figure 6:
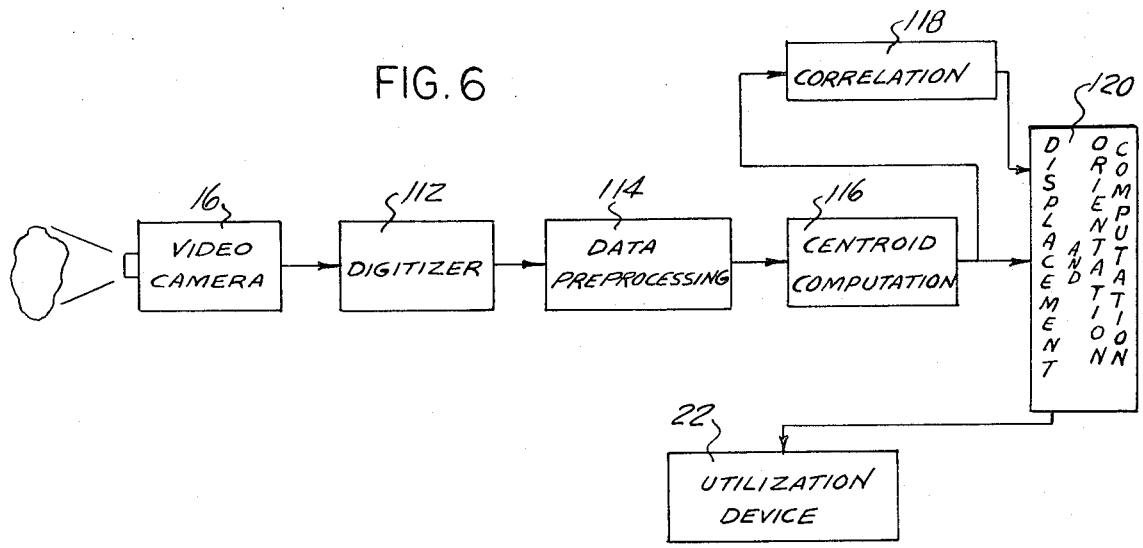
FIG. 6 is a flow sheet for a typical video data processing system used in the present invention.

The video system is of course an essential element of the present invention, but such systems per se are known in the present state of the art, and hence it is not felt necessary to describe in detail a particular system. The usual organization of such a system is depicted in FIG. 6 in block diagram form. This includes the video camera 16 previously referred to which typically produces an analog electrical signal which varies with the relative brightness of the image at particular points thereof as the image is scanned.

This analog signal is converted into digital form by a digitizer 112 which essentially is an A/D converter. In its simplest form, analog signals below a given threshold value are given a zero digital value, while all those above this value are given a one value. Some workpiece configurations and/or control needs may require a greater resolution of the image, in which case more orders of digital values may be required, that is, several corresponding digital values may be required.

This video digital data is stored as it is generated in a memory facility for further processing.

This digital data is then pre-processed to eliminate spurious data by known video data processing techniques at 114, which essentially tests isolated data points to see if they are valid and eliminates the same if they are not.

The data thus "cleaned up" is then used to compute the centroid of the image at 116, as by the use of known computer techniques and then is compared with stored data representing images of the correct workpiece, to verify that the workpiece deposited is the "correct" one. In addition, if several stable states of the workpiece are possible, the particular stable state assumed may be identified.

The particular location and orientation of the workpiece is then computed at 120 to generate a control signal for the utilization device 22.

Figure 7:
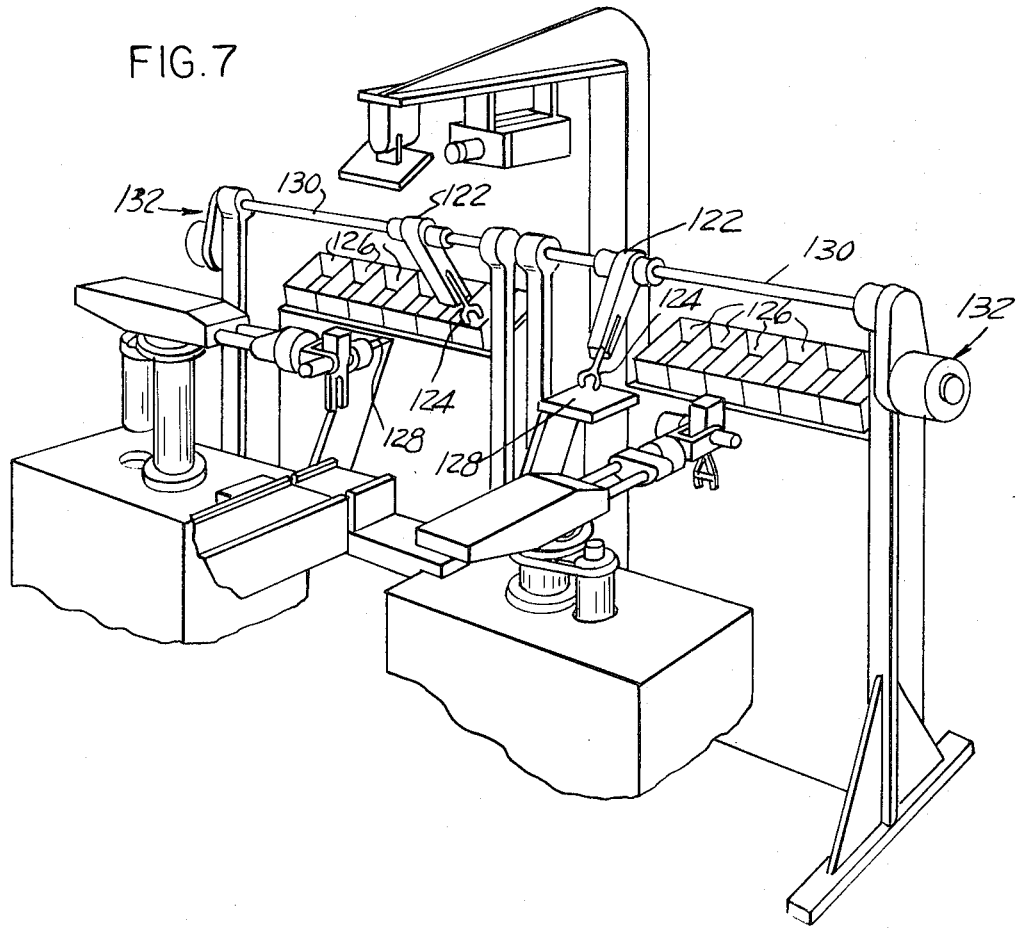
FIG. 7 is a perspective view of an alternate embodiment of a presenter system according to the present invention.

An alternate approach to the separator mechanism is depicted in FIG. 7, which shows a double presenter mechanism arrangement. Such doubling may be desirable in some applications to increase the capability of the system. This arrangement utilizes swing arms 122, having extensible pick up heads 124, which are adapted to extend into bulk storage locations 126 when the swing arms are rotated towards the bulk storage locations 126, and pick up workpieces contained therein. The swing arms 122 are then adapted to swing over staging locations 128 where the workpieces are to be deposited for further handling in the same manner as described above.

The swing arms 122 are also adapted to be traversed to the various bulk storage locations on traversing rods 130 rotated by drive units 132 controlled by the program control.

Since only one pick up operation at a time per system is possible, it can be appreciated that the supplying of separated workpieces cannot proceed as rapidly as in the first described embodiment, and accordingly for applications where this would be a limitation on performance of the system, the above-described embodiment is to be preferred.

From the above description it can be appreciated that a general purpose automatic presenter system has been provided which accomplishes the needs set forth above, in that it is relatively simple, can readily accommodate a wide variety of workpieces, and does not require breakthroughs in video data processing techniques.

It can also be appreciated that a great many variations are possible within the scope of the invention. For example, while the presenter system has been described in conjunction with an automatic assembly arm, it could be advantageously used in presenting parts for other processes such as machining or gaging.

Furthermore, many alternate approaches are possible to the means for carrying out control functions, the object position determining arrangement, the separator mechanism, the pick-up implements, etc. For example, a vibratory feeder mechanism could be used to separate the objects stored in bulk for certain object configurations.

I claim:

1. A presenter system comprising:
   a bulk storage location containing randomly oriented objects;
   a staging location;
   separator means periodically removing objects singly from said bulk storage location and depositing each object removed therefrom at said staging location in a random position;
   image producing means for determining the position of each of said objects deposited at said staging location;
   said image producing means including means for generating output signals corresponding to the determined position of the object at said stage location;
   utilization means operable in response to said output signals for manipulating object at said location.

2. The presenter system of claim 1 wherein said means determining said object means position includes a video system developing an image of said object at said staging location, also including means generating video data corresponding to said object image at said staging location and further including means computing said object position at said staging location from said generated video data.

3. The presenter system of claim 1 wherein said separator means includes pick up means picking up an object from said bulk storage location, and also includes means transferring object picked up by said pickup means to said staging location and depositing said object at said staging location.

4. The presenter system of claim 3 wherein said means determining said object means position includes a video system developing an image of said object at said staging location, also including means generating video data corresponding said object image at said staging location and further including means computing said object position at said staging location from said generated data.

5. The presenter system of claim 1 further including a plurality of bulk storage locations and wherein said separator means includes means periodically removing parts singly from each of said storage locations and depositing each object removed at said staging location.

* * * * *